United States Patent
Nemoto

(10) Patent No.: US 7,107,219 B2
(45) Date of Patent: Sep. 12, 2006

(54) COMMUNICATION APPARATUS

(75) Inventor: Kazuo Nemoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 09/682,896

(22) Filed: Oct. 30, 2001

(65) Prior Publication Data

US 2002/0069068 A1 Jun. 6, 2002

(30) Foreign Application Priority Data

Oct. 30, 2000 (JP) .............................. 2000-331428

(51) Int. Cl.
*G10L 21/00* (2006.01)

(52) U.S. Cl. .................. 704/271; 704/270; 341/20; 341/21; 341/22; 341/28; 400/71; 400/109.1; 400/110; 400/111; 400/87

(58) Field of Classification Search ............ 341/20–22, 341/28; 400/71, 87, 109.1, 110–111; 704/270, 704/275, 272, 271
See application file for complete search history.

(56) References Cited

U.S. PATENT DOCUMENTS

| | | | | |
|---|---|---|---|---|
| 4,694,494 A | * | 9/1987 | Woolfson | 704/260 |
| 5,047,952 A | * | 9/1991 | Kramer et al. | 704/271 |
| 5,287,102 A | * | 2/1994 | McKiel, Jr. | 340/825.19 |
| 5,293,464 A | * | 3/1994 | Hirano et al. | 358/1.1 |
| 5,311,175 A | * | 5/1994 | Waldman | 341/34 |
| 5,387,104 A | * | 2/1995 | Corder | 704/270 |
| 6,169,789 B1 | * | 1/2001 | Rao et al. | 379/110.01 |
| 6,380,923 B1 | * | 4/2002 | Fukumoto et al. | 345/156 |
| 6,546,431 B1 | * | 4/2003 | Brown et al. | 719/313 |
| 6,624,803 B1 | * | 9/2003 | Vanderheiden et al. | 345/156 |
| 6,658,272 B1 | * | 12/2003 | Lenchik et al. | 345/164 |
| 6,665,642 B1 | * | 12/2003 | Kanevsky et al. | 704/260 |

FOREIGN PATENT DOCUMENTS

| | | | | |
|---|---|---|---|---|
| GB | 2332172 A | * | 6/1999 | |
| JP | 6-6454 | | 1/1994 | |
| WO | WO 96/27256 | * | 9/1996 | |

* cited by examiner

*Primary Examiner*—Vijay Chawan
(74) *Attorney, Agent, or Firm*—Ference & Associates

(57) ABSTRACT

A terminal is designed so that a user who employs numerical keys, allocated for the entry of dots, can enter Braille dot combinations that are used for the input of characters. The input characters may be output as speech for feedback. Further, when a terminal accesses a server, Braille dot combinations can be entered in the above described manner, and speech can be fed back from the server. Furthermore, the server can provide a service for the user in accordance with a character string input at the terminal.

13 Claims, 15 Drawing Sheets

Fig. 5A
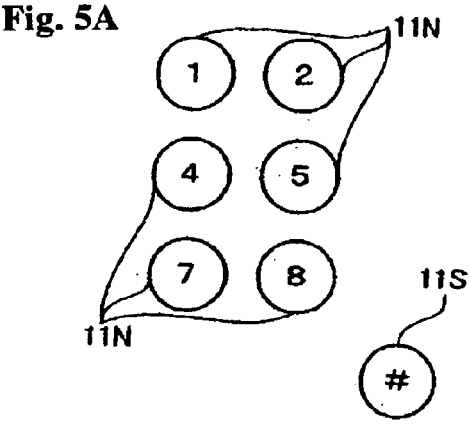 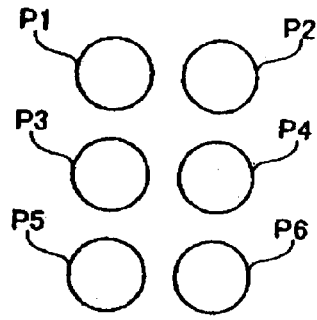
Fig. 5B
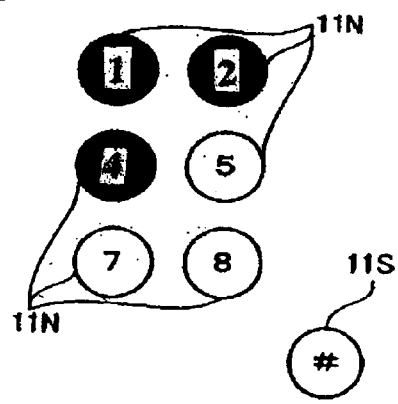 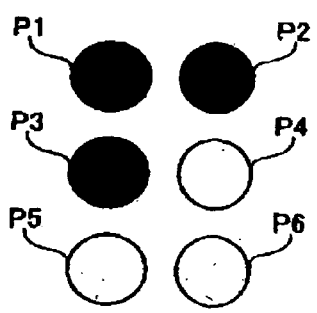
Figure 5
Fig. 5C
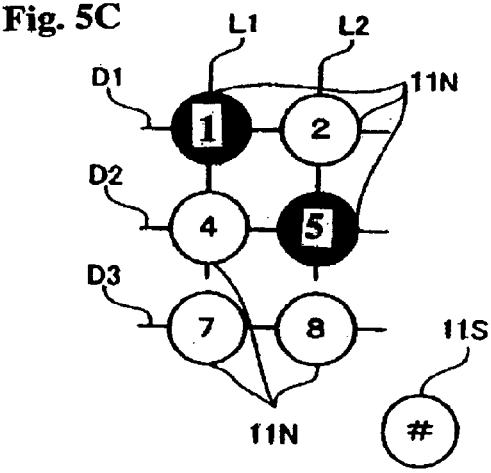 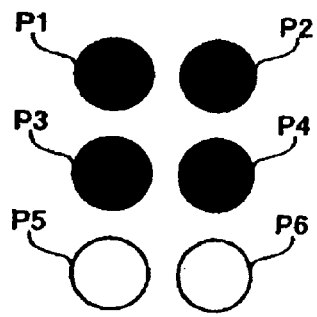

Figure 8

| Key | Order of characters displayed in accordance with the times of depressions |
|---|---|
| 1 | あ い う え お ぁ ぃ ぅ ぇ ぉ 1 |
| 2 | か き く け ⓒ が ぎ ぐ げ ご A B C 2 |
| 3 | さ し す せ そ ざ じ ず ぜ ぞ D E F 3 |
| 4 | た ち つ て と だ ぢ づ で ど っ G H I 4 |
| 5 | な に ぬ ね の J K L 5 |
| 6 | は ひ ふ へ ほ ば び ぶ べ ぼ ぱ ぴ ぷ ぺ ぽ Ⓜ N O 6 |
| 7 | ま み む め も P Q R 7 |
| 8 | や ゆ よ ゃ ゅ ょ S T U 8 |
| 9 | ら り る れ ろ V W X 9 |
| 0 | わ を ん " prolonged sound " Y Z 0 |
| * | delete one character |
| # | confirm |

○ : "ko" (kana character in Japanese)

Figure 14

| Digit of ten /Digit of one | 1 (a) | 2 (i) | 3 (u) | 4 (e) | 5 (o) | 6 | 7 | 8 | 9 | 0 |
|---|---|---|---|---|---|---|---|---|---|---|
| 1 | ア | イ | ウ | エ | オ | A | B | C | D | E |
| 2 (k) | カ | キ | ク | ケ | ⓒ | F | G | H | I | J |
| 3 (s) | サ | シ | ス | セ | ソ | K | L | M | N | O |
| 4 (t) | タ | チ | ツ | テ | ト | P | Q | R | S | T |
| 5 (n) | ナ | ニ | ヌ | ネ | ノ | U | V | W | X | Y |
| 6 (h) | ハ | ヒ | フ | ヘ | ホ | Z | | | (prolonged sound) | |
| 7 (m) | マ | ミ | ム | メ | モ | (represent the next character in a lower case) | | | | |
| 8 (y) | ヤ | | ユ | | ヨ | | | | delete one character | |
| 9 (r) | ラ | リ | ル | レ | ロ | 1 | 2 | 3 | 4 | 5 |
| 0 | ワ | ヲ | ン | (for sonant) | (for plosive) | 6 | 7 | 8 | 9 | 0 |

◯ : "ko" (kana character in Japanese)

Figure 15

COMMUNICATION APPARATUS

BACKGROUND OF INVENTION

1. Field of the Invention

The present invention relates to an input apparatus or a communication terminal used for character entry.

2. Background Art

With the wide spreading use of portable telephones and other mobile terminals, such terminals are very actively employed for exchanging messages. And as is well known, senders use terminal input keys when entering character strings for messages. For this purpose, various input methods are presently provided. According to one example method, numeric keys 0 to 9, an asterisk key "*" and a pound key "#" are employed when entering or deleting kana (Japanese characters) or alphabet characters, as well as when entering other data. FIG. 14 is a diagram showing example characters and operations assigned by this method to the keys of a portable telephone terminal. For example, to input the kana character "ko", numeric key "2" is depressed five times and the pound key is depressed to verify the entry. While for the character "M", numeric key "6" is depressed 16 times, followed by the pound key.

Another character string input method is the technique, disclosed, for example, in Japanese Published Unexamined Patent Application (PUPA) No. Hei 6-6454, that is used as an input method for a pager, such as a so-called pocket bell (hereinafter referred to as a pager method). As is shown in FIG. 15, according to this technique a two-digit number is input to enter a character. For these numbers, the first digit (the tens digit) represents a consonant "row", and the second digit (the units digit) represents a vowel "column". For example, since the kana character "ko" is in the "k" row and the "o" column, its number is "25", and to enter it, only key "2" and then key "5" are depressed. Therefore, two numbers consists one character.

However, with the conventional portable telephone terminal input method described above, the key "6" must be depressed 16 times to enter the alphabet character "M", and a great deal of time and effort are required.

According to the pager method disclosed in Japanese Published Unexamined Patent Application (PUPA) No. Hei 6-6454, only two key depressions are required to enter a character, which is certainly an advantage. Furthermore, the regularity with which numbers are assigned for kana characters "a" to "wo" makes it easy to remember them. However, since that regularity does not apply to the kana character "n", consonants and alphabet characters, the user must remember the numbers for these characters. Further, neither the portable telephone terminal method nor the pager method are very useful because each terminal maker arranges the input keys differently. In addition, although entering characters using a portable telephone terminal is frequently a one-handed-one-thumb operation, this can not be considered a superior process.

Furthermore, substantially, the conventional input method does not take usage by visually impaired persons into account. For while not merely a problem of the visually impaired, input errors tend to occur because so many movements of the thumb are required to manipulate the twelve input keys, "0" to "9", "*" and "#". Of course, since an input character appears on the display of a portable telephone terminal, an ordinary user can readily ascertain an entry error has been made, but no such means is available to assist a visually impaired person.

Recently, not only with personal computers but also with portable telephone terminals or other mobile terminals, it has become possible to use the Internet to obtain various services. But to avail one's self of a service, one must use a portable telephone terminal to access, through the Internet, the server that provides it, and must manipulate the portable telephone terminal in accordance with instructions that are received and displayed on a menu screen. However, since visually impaired persons can not see instructions received from servers when they are displayed on menu screens, they are effectively prevented from obtaining any services.

It is, therefore, one object of the present invention to provide an input apparatus, a communication terminal and a portable communication terminal that are eminently usable, especially by visually impaired persons when entering characters.

It is another object of the present invention to provide a speech feedback system, a speech feedback server and a communication terminal that can provide various services for visually impaired persons.

SUMMARY OF INVENTION

To achieve the above objects, according to an input apparatus for the present invention, keys for the two columns and three rows of dots used for Braille are allocated for multiple input key means. Manipulated keys are identified by key identification means, and based on the location of the identified keys, a corresponding Braille dot combination is specified by Braille specification means. Thereafter, character conversion means converts the Braille dot combination into a character, and the data for that character are output by character data output means. Thus, a user can input a character by employing the two columns and three rows of dots used for Braille.

Another feature of the present invention includes a communication terminal having a group of keys, arranged in a multiple row, multiple column matrix. Six keys are allocated for two columns and three rows of dots used for Braille. Further included is a processor, for specifying a Braille dot combination corresponding to manipulated keys, for converting the specified Braille dot combination into a character, and for outputting that character via a communication unit.

Still another feature of the present invention can be regarded as a portable communication terminal having a key body and a display body that can be folded together so that the surface of the key body on which operating keys are positioned and the surface of the display body on which a display panel is positioned are exposed.

According to yet another feature of the present invention a speech feedback system used in accordance with an operation user terminal, transmits a signal in accordance with the manipulation of operating keys. A server at a service provider converts the received signal into a character, and based on the character, generates a speech synthesis signal that it transmits as a feedback signal. Thereafter, the user terminal outputs speech based on the received feedback signal.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

FIG. 5A is a diagram showing a correlation between input terminal keys and for dots forming Braille dot combinations.

FIGS. 5B and 5C are diagrams showing specific input examples.

FIG. 8 is a succeeding diagram for FIG. 7.

FIG. 14 is a diagram showing an example conventional character input method.

FIG. 15 is a diagram showing another example conventional character input method.

DETAILED DESCRIPTION

Figure 1:
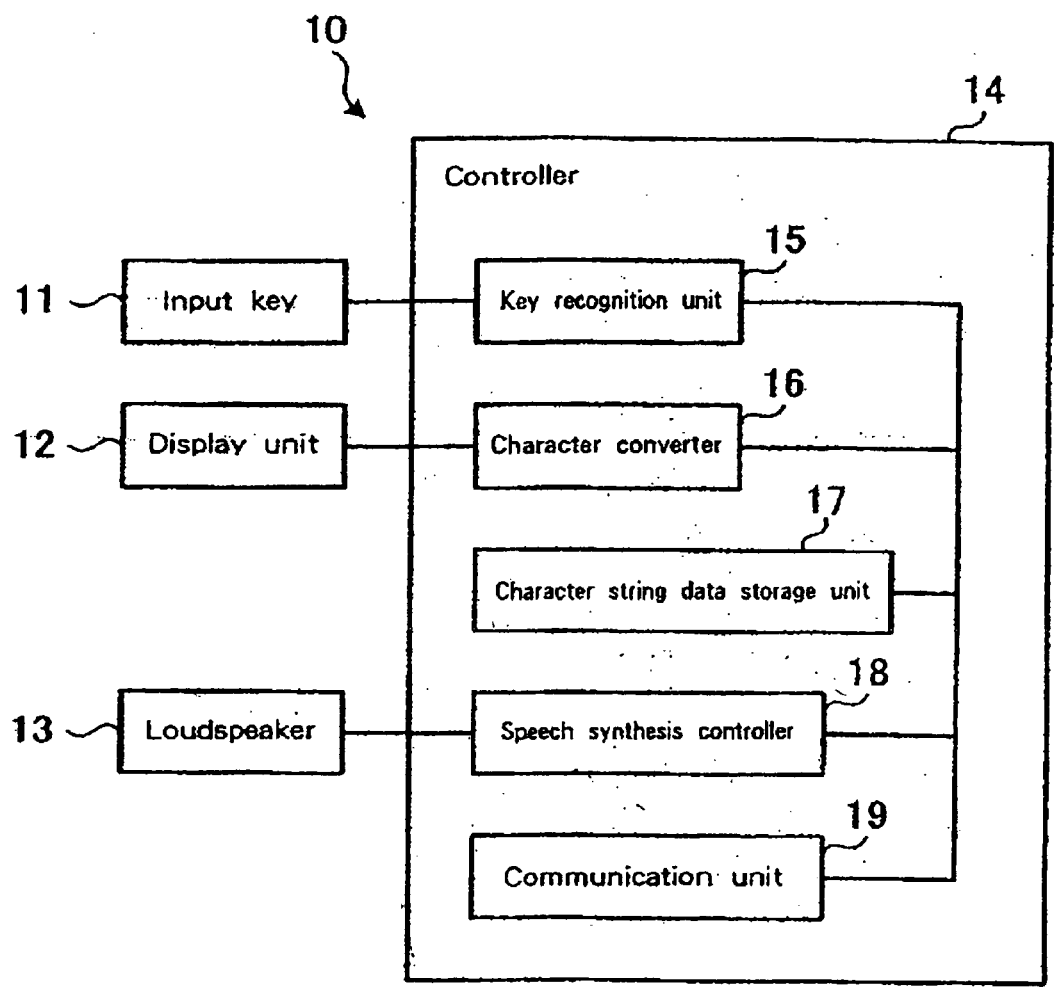
FIG. 1 is a diagram showing the configuration of a terminal according to a first embodiment.

The output character data destination may be either inside or outside the input apparatus. If the destination is inside, the character data may be used to form a character string that is stored in the memory of the input apparatus, and in addition, based on the data, the character may be displayed or printed. If, however, the output character data destination is outside the input apparatus, the character data may be transmitted to another terminal or server as a message to a correspondent.

When, based on character data, speech synthesis means generates speech synthesis data, and based on that data speech output means releases speech, a user can receive speech as feedback.

An arbitrary input apparatus can be employed so long as characters are input in Braille. Thus, a portable telephone terminal or various other information terminals may be employed.

For of group of keys arranged as a matrix, since the arrangement of the keys matches the arrangement of the dots used for Braille, so long as a person understands Braille, he or she can easily achieve proficiency in the use of keys that are arranged horizontally or obliquely. A first key mode, for allocating ordinary numbers, such as 0 to 9, or symbols, such as * and #, and a second Braille, may be switched between, and a third key mode, for allocating characters, may also be added and switched to. Therefore, when the numeric keys used for entering telephone numbers (numbers) are the keys regularly employed for the telephone terminal, the Braille input mode and the character input mode can also be provided, while the additional character input mode can be, for example, either the contemporary portable telephone terminal method or the pager method. One or more of these modes may be included. In the second mode, Braille viewed from the Braille reading face and Braille viewed from the Braille writing face may be selectable when allocating Braille dot combinations to the keys.

When a tone generator, for generating different tones for each column and row of the keys, has a so-called DTMF (Dual Tone Multiple Frequency) function, and when n keys have been manipulated and tones corresponding to two columns and n rows are detected, it may be assumed that keys have been manipulated that are located where the two columns and n rows intersect. This arrangement is especially effective when a server receives and processes tones.

The dots used for Braille are allocated for keys arranged in two columns and three rows, and n is either two or three. When two keys are manipulated and tones corresponding to two columns and two rows are detected, it is assumed that four keys located at positions whereat two columns and two rows intersect have been manipulated, and when three keys are manipulated and tones corresponding to two columns and three rows are detected, it is assumed that six keys located where two columns and three rows intersect have been manipulated. As a result, key manipulation can be eliminated for a communication terminal that permits the depression of only one key each time. When the same key is depressed multiple times in the second mode, these depressions may be regarded as a single depression. And since Braille is not affected when the same key is manipulated at multiple times for one character, the erroneous operation can be allowed.

Thus, when a portable communication terminal is held so that the display panel side faces the user and the operating key side, the reverse, faces away from the user, the user can easily manipulate the operating keys by using one finger of the hand grasping the terminal. With the portable communication terminal, when the dots for Braille are allocated for six operating keys arranged as two columns and three rows, Braille dot combinations can be input. Furthermore, speech feedback corresponding to the input characters can also be provided. When the dots for Braille are allocated to a column near one end of the key body and to another column near the other end, a user can easily use both hands to hold the portable communication terminal and manipulate the keys.

When a character is entered at a user terminal, corresponding speech is fed back by the server at the service provider. In this case, at the user terminal only the operating keys are manipulated, while the character conversion and the generation of the speech synthesis signal are performed by the server at the service provider. Thus, since the user terminal must perform no new function, a conventional terminal can be employed.

Also, at the user terminal the operating keys may merely be regarded as dots used for entering Braille. In this case, in accordance with the manipulation of the operating keys, the character converter specifies a Braille dot combination that it converts into a character. Further, the server at the service provider may output, as a speech signal, a message requesting input by the user terminal. Thus, the message may be output orally by the user terminal, thereby increasing the usability for a visually impaired person.

Furthermore, the server at the service provider and the speech feedback server can, by sequentially accumulating characters obtained by conversion, generate a character string a user has employed to submit a request, and perform a process in response to the request.

In this case, the user terminal transmits, to an external host server, a signal or signals consonant with the manipulation of the keys. The host server, in turn, converts the signal or signals into Braille, and generates a speech response signal corresponding to a character or characters obtained by converting the Braille. The user terminal may thereafter receive the speech response signal and output speech based on the signal. At this time, however, the speech response signal may not merely be the reading of the character or the string of characters obtained by converting the Braille, but may instead be a response engendered by the content of the character string. More specifically, when "search" is entered by the terminal, either "search" is read orally, or a response such as "What do you want to search?" is issued.

The preferred embodiments of the present invention will now be described in detail while referring to the accompanying drawings.

FIG. 1 is a diagram for explaining the basic configuration of a communication terminal (hereinafter referred to simply as a "terminal") according to a first embodiment of the invention. As is shown in FIG. 1, a terminal 10, which serves as an input apparatus and a communication terminal, includes: multiple input keys (input means, a key group and an operating key) 11, such as numerical keys and other symbol keys; a display unit 12, for displaying information such as characters entered using the input keys 11; a loudspeaker (speech output means) 13, for releasing speech; and a controller (processor) 14, for providing overall control of the operation.

The controller 14 includes a key recognition unit (key identification means and a key detector) 15, a character converter (Braille specification means, character conversion means and character data output means) 16, a character string data storage unit 17, a speech synthesis controller (speech synthesis means) 18 and a communication unit 19, and performs a process based on a control program stored in the memory area (not shown) of the controller 14.

Upon the manipulation of the input keys 11, the key recognition unit 15 identifies the input keys 11 and transfers a corresponding entry to the character converter 16.

Upon the receipt of the entry, the character converter 16 converts it into a character correlated in advance. This character conversion is performed for each character, and the obtained character data are transmitted (output) to the character string data storage unit 17. In addition, although not always required, the character data obtained by the character converter 16 may be output to the display unit 12 for display thereon.

The character string data storage unit 17 is used to sequentially store the character data as they are received from the character converter 16, and based on this character data, generates a character string. Then, when a predetermined command is input, the character string data storage unit 17 transmits the data for the generated character string to the speech synthesis controller 18.

The speech synthesis controller 18 employs a speech synthesis program, stored in advance in the memory area of the controller 14, to perform a speech synthesis process and generate speech data based on the received character string data. Then, synthesized speech based on the speech data is output through the loudspeaker 13.

The communication unit 19 is used to communicate with an external device using a public telephone network or the Internet, or some other network.

Figure 2:
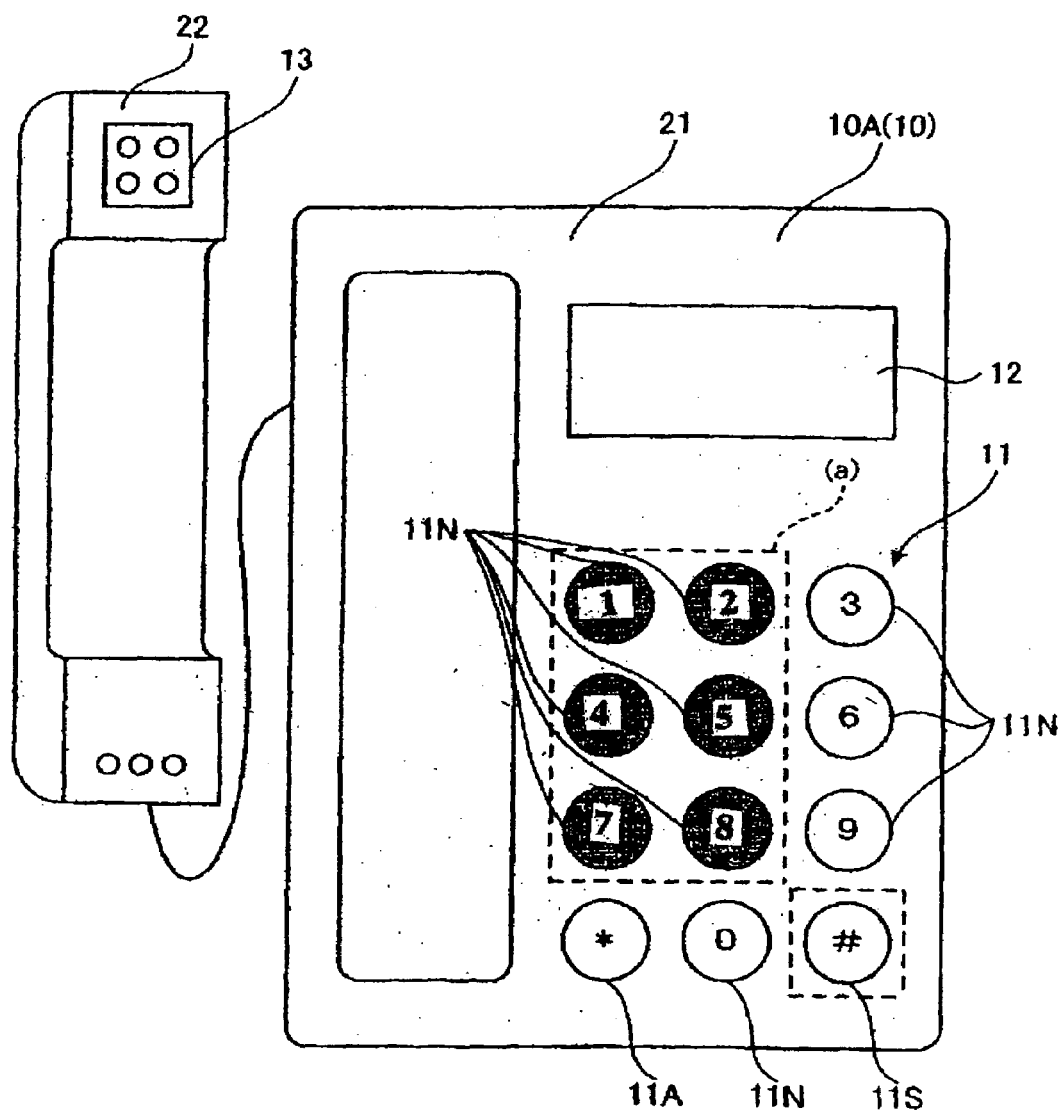
FIG. 2 is a diagram showing an example terminal.
Figure 3:
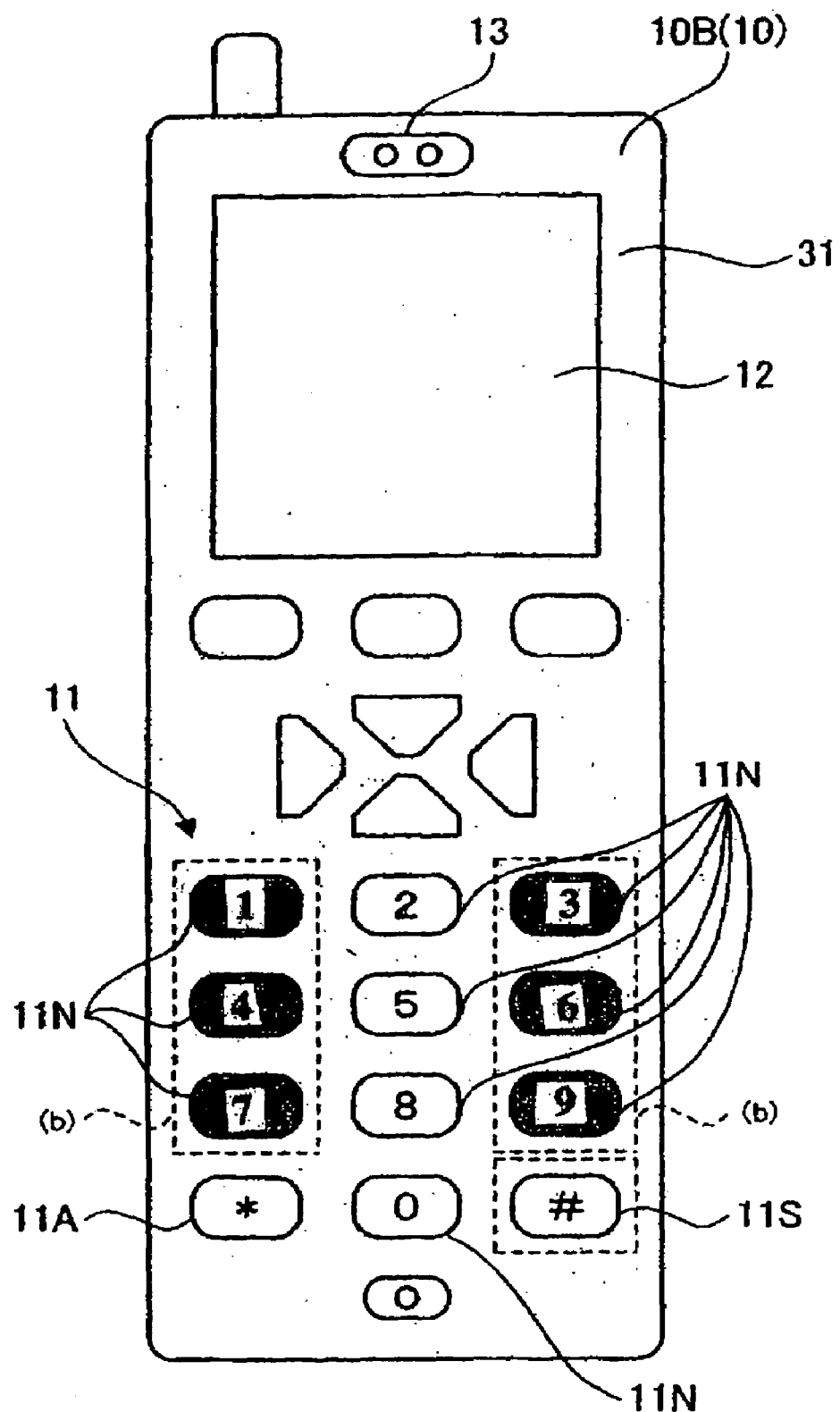
FIG. 3 is a diagram showing another example terminal.
Figure 4:
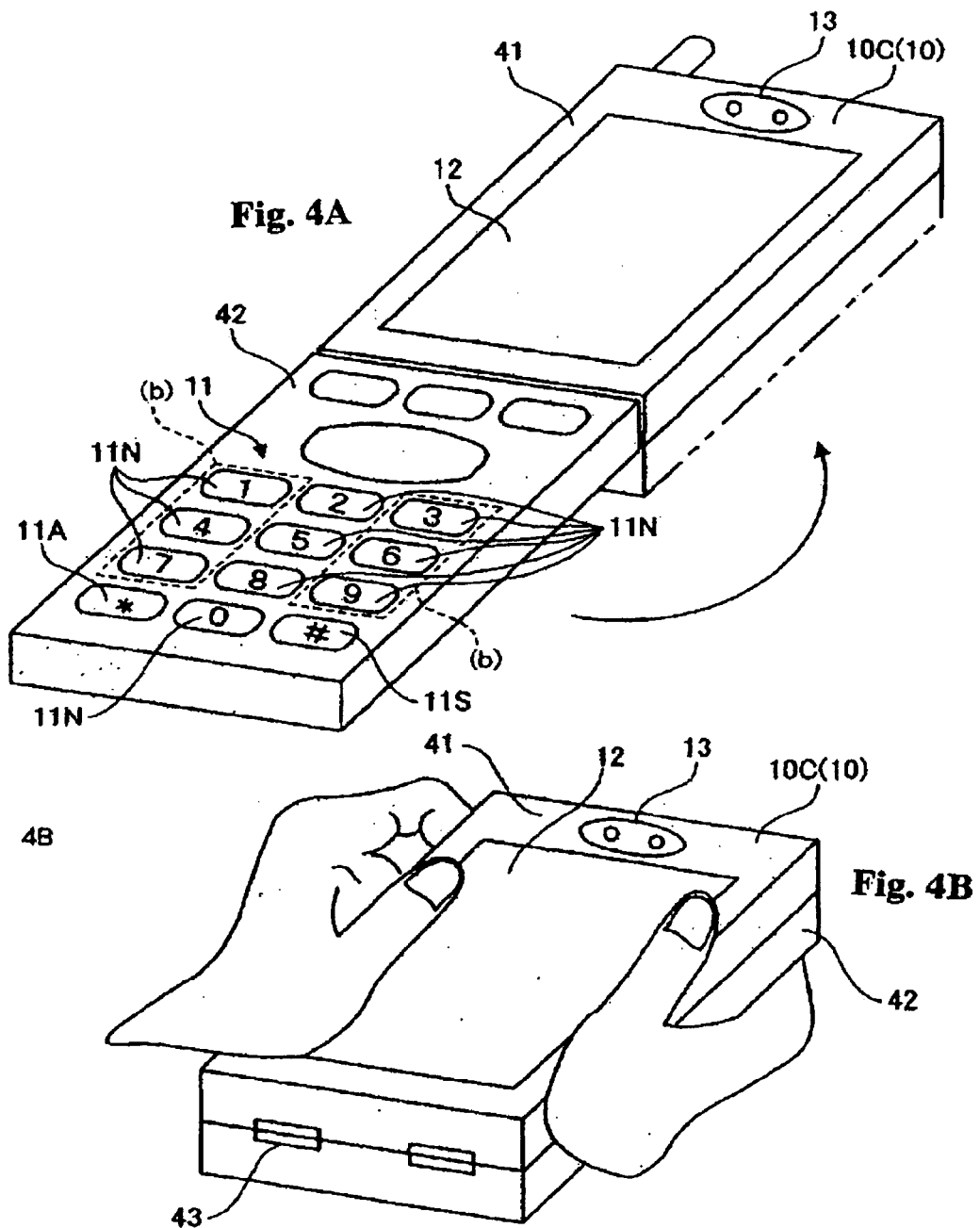
FIG. 4A is a diagram showing an additional example terminal that is open.
FIG. 4B is a diagram showing an additional example terminal that has been folded.

FIGS. 2 to 4 are diagrams showing specific examples for the terminal 10. A terminal 10A in FIG. 2 is a so-called stationary telephone set, and its main body 21 includes, as input keys 11, numerical keys 11N for entering the numbers 0 to 9, an asterisk key 11A for entering the symbol "*", and a pound sign key 11S for entering the symbol "#". In addition, a display unit 12 is provided for the main body 21 of the terminal 10A, and a loudspeaker 13 is provided for a handset 22.

A terminal 10B in FIG. 3 is a portable telephone terminal, such as a portable telephone or a PHS (Personal Handyphone System), and its main body 31 includes, as the input keys 11, numerical keys 11N, an asterisk key 11A, a pound sign key 11S, a display unit 12 and a loudspeaker 13. An arbitrary terminal 10B can be employed so long as the main body 31 includes the numerical keys 11N, the asterisk key 11A, the pound sign key 11S and the loudspeaker 13. Thus, for example, a cordless telephone can fall in the terminal 10B category. In this case, the display unit 12 is not a requisite component.

A terminal 10C in FIGS. 4A and 4B is a folding type telephone terminal, for which a monitor body (display body) 41 and a key body 42 are coupled pivotally at hinges 43. The monitor body 41 includes a display unit 12 and a loudspeaker 13, and the key body 42 includes, as the input keys 11, numerical keys 11N, an asterisk key 11A and a pound sign key 11S. As is indicated by an arrow in FIG. 4A, The terminal 10C can be folded at the hinges 43, so that the face of the monitor body 41, wherein the display unit 12 is provided, and the face of the key body 42, whereon the input keys 11 are provided, are exposed.

The terminal 10C in the folded state is shown in FIG. 4B. In this state, a user can use both hands to hold the terminal 10C with the display unit 12 facing up (this side is regarded as the obverse), and can use the fingers of both hands to manipulate the input keys located on the reverse.

The terminal 10, which can be represented by the terminals 10A, 10B and 10C, permits the input, using the input keys 11, not only of numbers in the original number input mode (first mode), but also of characters either in the so-called portable telephone terminal character input mode (the third mode) or in the pager character input mode (the third mode), or in the Braille character input mode (the second mode). These modes can be either user or automatically selected.

Braille character input will now be explained. For Braille, an entry is represented by a six-dot, two column and three row combination. For character input, of the input keys 11 the terminal 10 permits two columns of three keys each to be used for the entry of a Braille dot combination, and converts the entry into a character. For the terminals 10A in FIG. 2, for example, of the numerical keys 11N, keys "1", "2", "4", "5", "7" and "8" (the block enclosed by broken line a in FIG. 2) are employed. Of course, the keys "2", "3", "5", "6", "8" and "9" may also be employed.

For the terminals 10B and 10C in FIGS. 3 and 4, the numerical keys 11N in the columns to either side of the terminals, e.g., keys "1", "3", "4", "6", "7" and "9" (the blocks enclosed by broken lines b in FIGS. 3 and 4), are employed. Thus, a user can use both hands to manipulate the numerical keys 11N of the terminals 10B and 10C.

An example Braille entry using the terminal 10 (10A, 10B or 10c) is given below.

For this example, the numerical keys 11N of the terminal 10A in FIG. 2 are used. As is shown in FIG. 5A, for the entry of Braille, certain of the numerical keys 11N, arranged in two columns and three rows, are allocated for dots P1 to P6. More specifically, of the numerical keys 11N, "1" is allocated for the top left top dot P1, "2" is allocated for the top right top dot P2, "4" is allocated for the middle left dot P3, "5" is allocated for the middle right dot P4, "7" is allocated for the bottom left dot PS, and "8" is allocated for the bottom right dot P6. In addition, the pound sign key 11S is allocated as an entry confirmation key. Of the numerical keys 11N, a terminal 10A user manipulates keys "1", "2", "4", "5", "7" and "8" for a Braille entry, and confirms the entry using the pound sign key (sharp mark key) 11S. Then, after the pound sign key 11S has been entered, the key recognition unit 15 in FIG. 1 identifies the numerical keys 11N that were manipulated, and the character converter 16 employs those numerical keys 11N to specify the Braille dot combination that was input.

Figure 6:
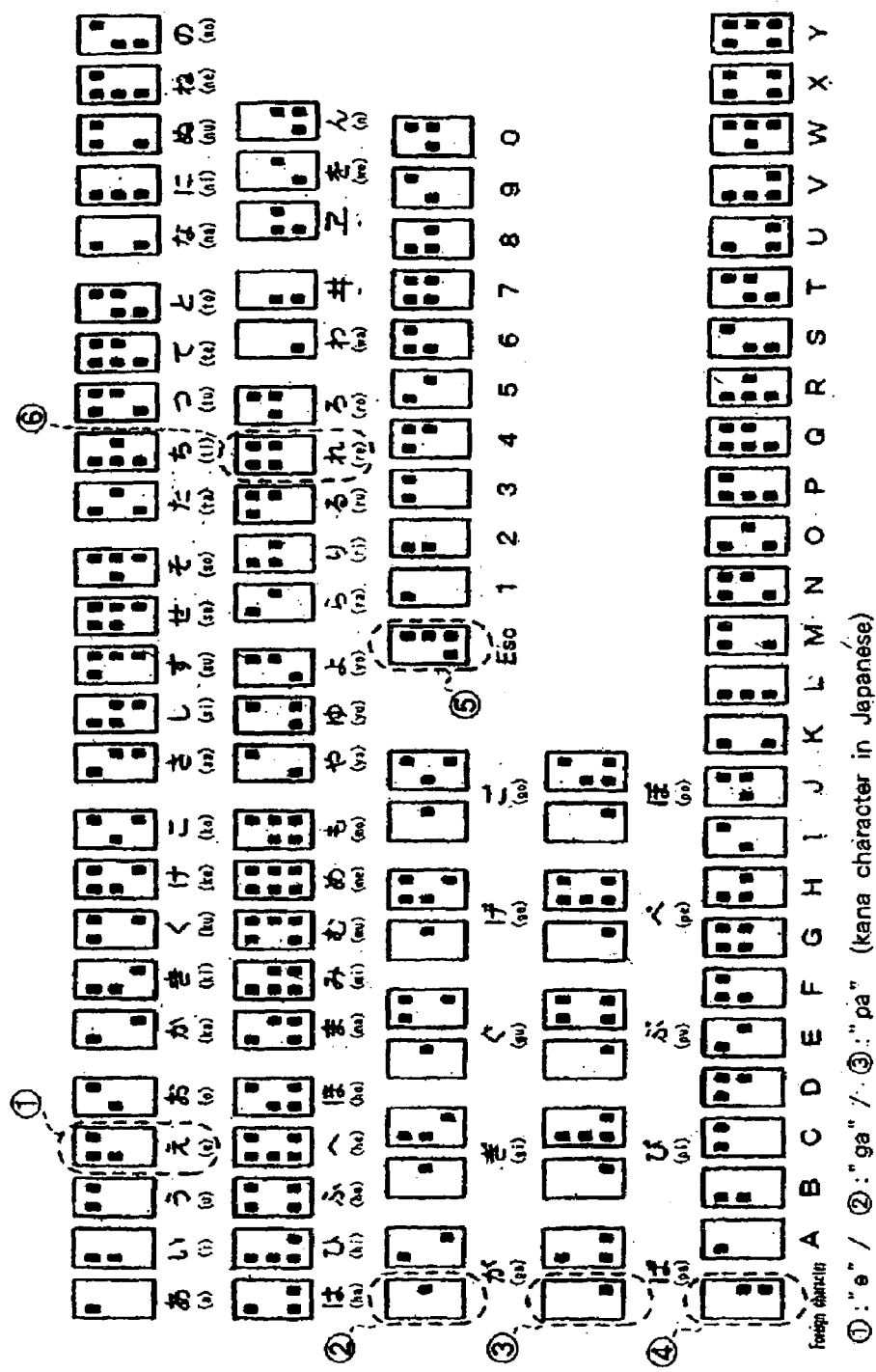
FIG. 6 is a diagram showing one part of a Braille list in Japanese.
Figure 7:
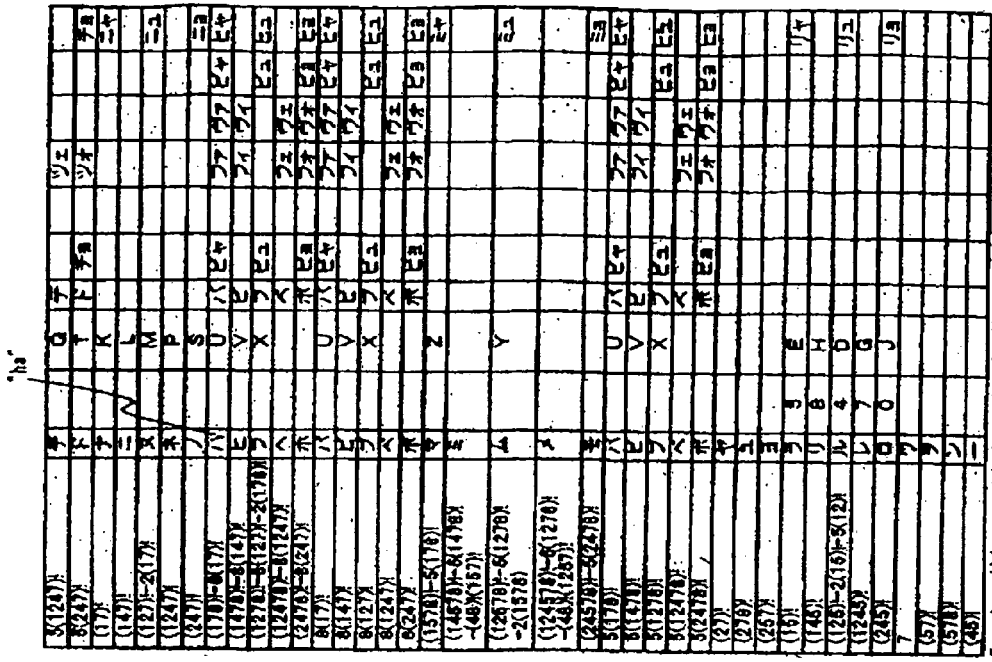
FIG. 7 is a diagram showing the list for the Braille input method in this embodiment.
Figure 8:
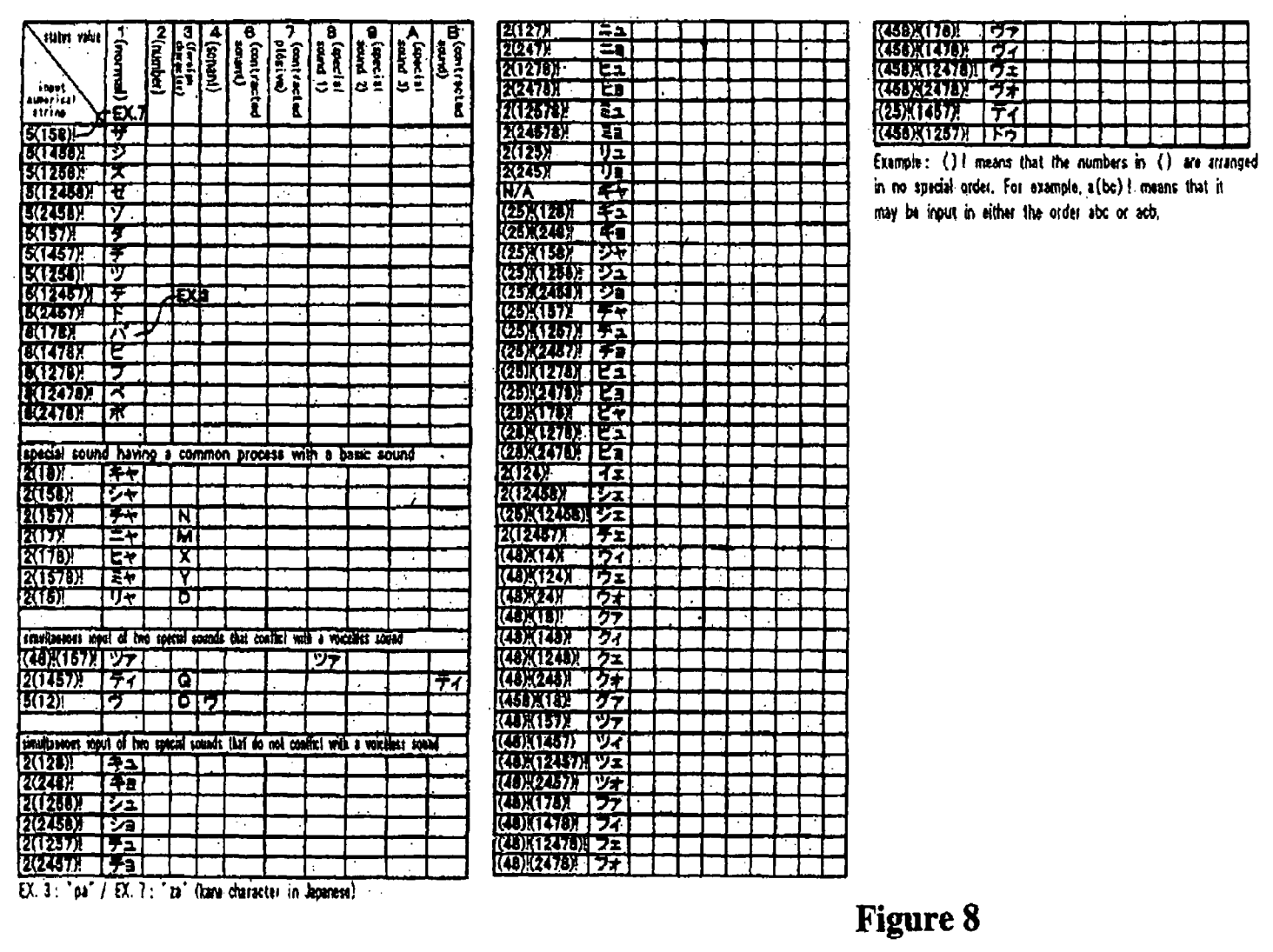

One part of the correlation of the Braille dot combinations and characters is shown in FIG. 6. Other numerical strings entered using keys and corresponding Braille dot combinations are shown in FIGS. 7 and 8. In FIGS. 7 and 8, the column for the "input numerical string" represents the types (numbers) of numerical keys 11N that are manipulated before an entry is confirmed by the depression of the pound sign key 11S. A specific input example using the terminal 10 will now be explained based on the correlations shown in FIGS. 6, 7 and 8.

For example, to input "e" in 1 in FIG. 6, as is shown in FIG. 5B, the numerical keys 11N for "1", "2" and "4" are manipulated and the pound sign key 11S is depressed. This establishes the entry of the Braille dot combination corresponding to the dots P1, P2 and P3, i.e., the "e" in Braille (Ex. 1 in FIG. 7).

To input the Braille for a kana character representing a sonant, such as "ga", as is shown by 2 in FIG. 6, the numerical key 11N for "5" is depressed, and then the pound sign key 11S is depressed to shift to the sonant input mode. Following this, the numerical keys 11N for "1" and "8", which correspond to "ka", are entered, and the entry is confirmed by the depression of the pound sign key 11S. As a result, "ga" is input in Braille (Ex. 2 in FIG. 7).

Further, to input the Braille for a kana character representing a plosive, such as "pa", as is shown by 3 in FIG. 6, the numerical key 11N for "8" is depressed, and then the pound sign key 11S is depressed to shift to the plosive input mode. Following this, the numerical keys 11N for "1", "7" and "8", which correspond to "ha", are depressed, and the entry is confirmed by the depression of the pound sign key 11S (Ex. 3 in FIG. 8).

To input Braille for a foreign (alphabet) character, such as A, as is shown by 4 in FIG. 6, the numerical keys 11N for "5" and "8" are depressed, and then the pound sign key 11S is depressed to shift to the foreign character input mode. Following this, the numerical key 11N for "1", which corresponds to "A", is depressed, and the entry is confirmed by the depression of the pound sign key 11S (Ex. 4 in FIG. 7).

To input the Braille for a number, such as "1", as is shown by 5 in FIG. 6, the numerical keys 11N for "2", "5", "7" and "8" are depressed, and the pound sign key 11S is depressed for confirmation. As a result, the "Esc (escape)" operation is performed and the mode is shifted to the number input mode. Then, the numerical key 11N for "1", which corresponds to the number "1", is depressed, and the entry is confirmed by the depression of the pound sign key 11S (Ex. 5 in FIG. 7). It should be noted that, after the Esc operation, the numbers in Braille may be used as well for the input of kana character; however, the numbers represented by the numerical keys 11N may be directly input before the confirmation using the pound sign key 11S is performed.

For contracted sonants and contracted plosives, the numerical keys 11N for "2" and "5" are depressed; for special sounds, the numerical keys 11N for "4" and "8", or "4", "5" and "8", or "2" and "8" are depressed; and for contracted sounds, the numerical key 11N for "2" is depressed.

It should be noted that no restrictions are placed on the depression order used for the keys for the above entries. For example, to input kana character "e", the numerical keys 11N may be depressed in order from "1" to "2" to "4", from "1" to "4" to "2", from "2" to "1" to "4", from "2" to "4" to "1", from "4" to "1" to "2" or from "4" to "2" to "1". In the "input numerical string" column in Ex. 6 in FIG. 7, "(124)!" indicates that an arbitrary order can be employed for inputting the numerical string 1, 2 and 4. To cope with this, during a period before the pound sign key 11S is depressed for confirmation, the character converter 16 employs the manipulations of the numerical keys 11N identified by the key recognition unit 15 to specify a corresponding Braille dot combination. This also applies for all other Braille dot combinations. Further, when the same numerical keys 11N are depressed multiple times before the pound sign key 11S is depressed, for example, when the numerical keys 11N are depressed in the order "1", "2", "2" and "4" or "2", "1", "2" and "4" to enter "e", the "e" in Braille is correctly input because no erroneous identification occurs.

As is described above, to input a sonant such as "ga" or a plosive such as "pa", the numerical key 11N for "5" or "8" is depressed and the pound sign key 11S is depressed for confirmation. However, the depression of the pound sign key 11S may be eliminated. For example, as is shown in Ex. 7 in FIG. 8, to input "za", the numerical key 11N for "5" is depressed to shift the mode to the sonant input mode, then, the numerical keys 11N for "1", "5" and "8", which correspond to "sa", are depressed, and finally, the pound sign key 11S is depressed for confirmation. That is, the numerical keys 11N for "5", "1", "5" and "8" must be depressed sequentially. Furthermore, to input a sonant, the numerical key 11N for "5" is depressed to shift the mode to the sonant input mode, or to input a plosive, the numerical key 11N for "8" is depressed to shift the mode to the plosive input mode. But when the number string to be sequentially input for a character includes "5" or "8", the corresponding numerical key may not be depressed. Specifically, to input "da", originally it is necessary to depress the numerical key 11N for "5" to shift the mode to the sonant input mode and the numerical keys 11N for "1", "5" and "7", which correspond to "ta". However, since the numerical key 11N for "5" is overlapped, only the numerical key 11N for "5", for shifting the mode to the sonant input mode, followed by the numerical keys 11N for "1" and "7" must be depressed, while the overlapped "5" is skipped (Ex. 8 in FIG. 7). In input number string "(157)!-5(17)!" shown in Ex. 9 in FIG. 7, "–" represents "removal". Since the character "da" is obtained by entering "5(17)!" according to the above rule, the above number string means that, to input "ta", the number string corresponding to "da" is eliminated by the expression "(157)!-5(17)!".

When DTMF (Dual Tone Multiple Frequency) is employed for the terminal 10A, key manipulation can be eliminated to input, for example, "te" in Braille. As is shown in FIG. 5C and by 6 in FIG. 6, for the Braille entry corresponding to "re", the top dots P1 and P2 and the middle dots P3 and P4 occupy parallel positions. In this case, originally a total of four numerical keys 11N, "1", "2", "4" and "5", had to be depressed. However, in this embodiment, only the numerical keys 11N for "1" and "5" or for "2" and "4" need be depressed.

According to DTMF, the frequency of the tone that is generated for each key by a tone generator (not shown) is changed upon the manipulation of an input key 11, and a different frequency is set for a tone that is to be generated for the input key 11 of each column and each row. For example, in FIG. 5C, a tone having a frequency L1 is allocated for the column of the numerical keys 11N for "1", "4" and "7", and a tone having a frequency L2 is allocated for the column of the numerical keys 11N for "2", "5" and "8". Further, a tone having a frequency D1 is allocated for the row of the numerical keys 11N for "1" and "2", a tone having a frequency D2 is allocated for the row of the numerical keys 11N for "4" and "5", and a tone having a frequency D3 is allocated for the row of the numerical keys 11N for "7" and "8". Therefore, when each of the numerical keys 11N are manipulated, two tones having frequencies corresponding to the column and row of the key are generated. Thus, for example, when the numerical key 11N for "1 " is depressed, the two tones having frequencies L1 and D1 are generated. And based on the tones that are generated, the key recognition unit 15 of the controller 14 can identify the depressed key.

Similarly, when the numerical keys 11N for "1", "2", "4" and "5" are manipulated, the tones having the frequencies L1, L2, D1 and D2 are generated. And since the tones having the frequencies L1, L2, D1 and D2 are also generated by depressing only the numerical keys 11N for "1" and "5" or for "2" and "4", further key manipulation can be skipped.

This key manipulation skipping can be applied for numerical keys 11N that include a total of four keys in two columns and two rows, or a total of six keys in two columns and three rows, such as in the examples shown in FIG. 6 for the input of "se", "te", "hu(fu)", "he(fe)", "mi", "mu", "me" and "mo".

In addition, if the controller 14 of the terminal 10A can cope with the simultaneous depression of several of the numerical keys 11N for "1", "2", "4", "5", "7" and "8", fast key input can be performed.

Figure 9:
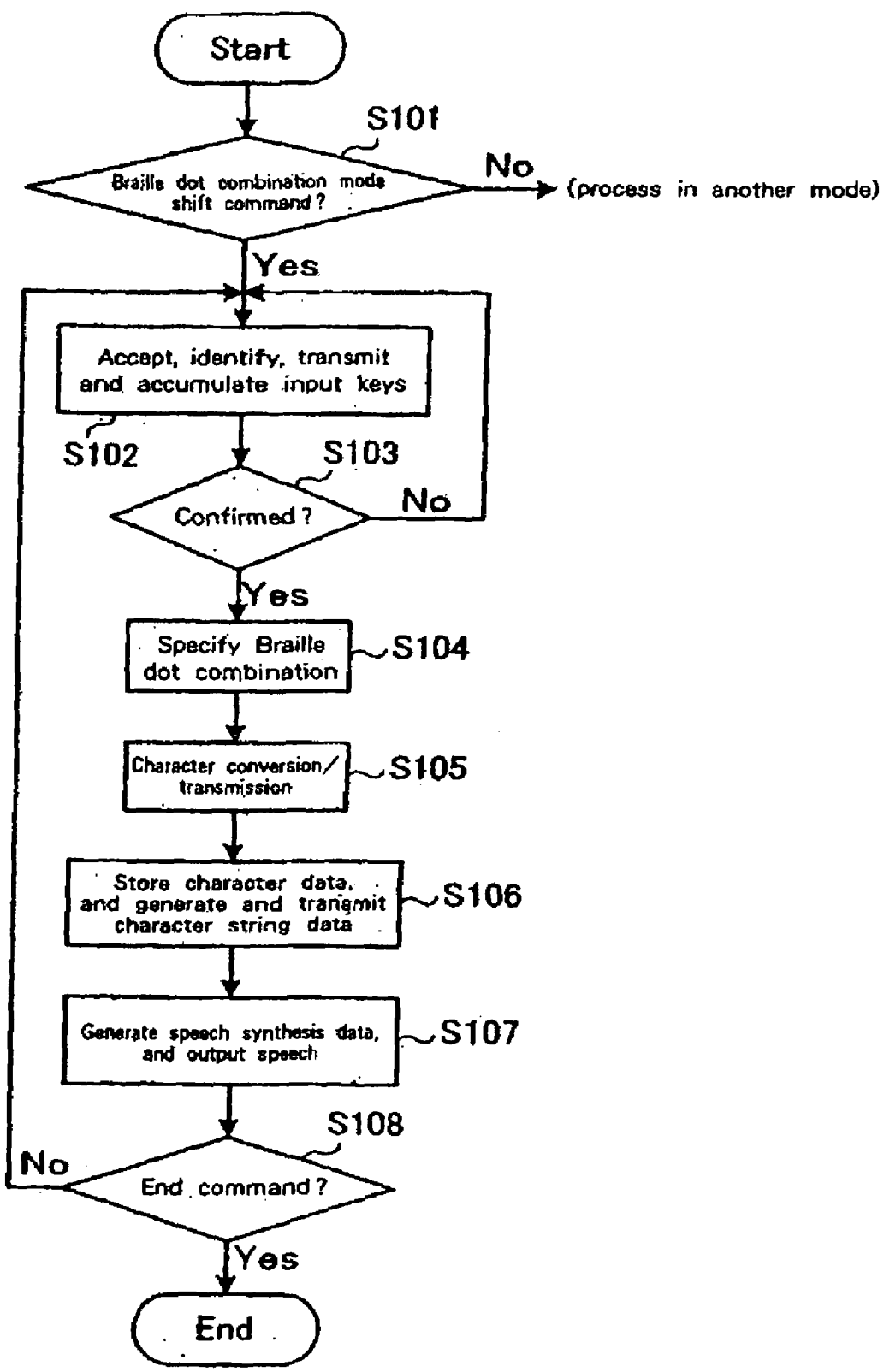
FIG. 9 is a flowchart showing the processing performed for inputting Braille.

An explanation will now be given, while referring to FIG. 9, for the character input process sequence performed by the terminal 10A that permits the entry of Braille in the above described manner.

In the default state, the numerical keys 11N of the terminal 10A are set in the numerical input mode for the entry of numbers. In this state, upon the receipt of a predetermined command, the mode is shifted to a character input mode.

Further, when the terminal 10A is shifted to the character input mode, in accordance with the operation for inputting the first character it can automatically determine whether the input mode is the Braille mode, the portable telephone terminal mode or the pager mode. In this case, the portable telephone terminal character input mode, for example, is the default, and a priority order is established for the Braille and the pager character input modes.

When the numerical key 11N for "7" is depressed and the pound sign key 11S is depressed to confirm the entry, since in accordance with the portable telephone terminal mode this represents "ma", while in accordance with the Braille mode this represents "wa", a conflict occurs. If another character is input, however, no conflict occurs (although the manipulation for entering "a" is common both to the portable telephone terminal mode and the Braille mode). Therefore, so long as the keys depressed for the first character do not represent "ma" in the portable telephone terminal mode and "wa" in the Braille mode, the terminal 10A can automatically determine, from the first character, whether the character input mode is the portable telephone terminal mode or the Braille mode. When the keys depressed for the first character represent "ma" in the portable telephone terminal mode and "wa" in the Braille mode, in accordance with the manipulation of the numerical key 11N, as feedback, the character converted using the default portable telephone terminal mode is displayed on the display unit 12, or is output as speech from the loudspeaker 13. Then, if the user tries to input characters using Braille, a "delete" operation is performed for the first character and the initial process performed for the first character is repeated. Then, after this operation is detected by the key recognition unit 15, the mode is automatically shifted to the Braille input mode. If, however, the user tries to input characters using the pager character input mode, the mode is shifted to the Braille input mode and the same operation as that described above is performed. Thereafter, when this is detected by the key recognition unit 15, the mode is shifted to the pager character input mode.

When the user issues a predetermined command to select, for the terminal 10A, the Braille character input mode, the portable telephone terminal character input mode, or the pager character input mode, the same character input mode is thereafter maintained so long as the user does not enter a mode change command. Further, once the Braille, the portable telephone terminal or the pager character input mode is selected, the selected character input mode data may be stored in the memory (not shown) of the terminal 10A, and the next time the character input mode is shifted, the previously selected character input mode may be automatically selected by referring to the stored character input mode data.

For character entry using the terminal 10A, first, the portable telephone terminal character input mode, the pager character input mode or the Braille dot combination input mode is selected by employing the above described automatic identification process, or by a user. Then, when a command corresponding to the selected character input mode is generated, at step S101 the controller 14 of the terminal 10A identifies the type of command. Since the explanation for this embodiment will mainly cover Braille input, at step S101 a check is performed to determine whether the generated command is for shifting the input character mode to the Braille input mode. When it is ascertained that the generated command is a command for shifting the mode to the portable telephone terminal character input mode or to the pager character input mode, thereafter the character converter 16 shifts the mode to the portable telephone terminal character input mode in FIG. 14, or to the pager character input mode shown in FIG. 15. Since in the pager character input mode, all the characters are always defined as a two-digit matrix, all character entries can be sequentially accepted without requiring confirmation using the pound sign key 11S.

But when at step S101 it is ascertained that the generated command is one for shifting the mode to the Braille input mode, the character converter 16 accepts Braille entries.

When the user has selected the character input mode in the above described manner, and begins to enter a character string using Braille by manipulating the numerical keys 11N for "1", "2", "4", "5", "7 " and "8", the key recognition unit 15 identifies the manipulated numerical keys 11N and transmits the data therefore to the character converter 16 (step S102).

The character converter 16 determines whether the pound sign key 11S is depressed for confirmation for each character (step S103), and so long as the confirmation operation is not detected, the manipulations of the numerical keys 11N identified by the key recognition unit 15 are accumulated. Then, when the confirmation using the pound sign key 11S is detected, the accumulated numerical key 11N manipulations, i.e., the numerical string entered using the numerical keys 11N, is employed to specify a Braille dot combination based on the correlations shown in FIGS. 6, 7 and 8 (step S104). Subsequently, the character converter 16 converts the specified Braille dot combination into a corresponding character, and transmits (outputs) the data for the character to the character string data storage unit 17 (step S105).

The character string data storage unit 17 stores the character data in the order they are received from the character converter 16 following the character conversion, and generates a character string (step S106). Each time a new character is added to the current character string, the character string data storage unit 17 transmits the data for the generated character string to the speech synthesis controller 18. The generated character string may also be displayed on the display unit 12 based on the data therefore.

Based on the data for the generated character string, the speech synthesis controller 18 employs a speech synthesis program, stored in advance in the memory area of the controller 14, to perform a speech synthesis process, and generates speech synthesis data that it uses to output speech through the loudspeaker 13 (step S107).

Then, a check is performed to determine whether the user has entered a predetermined end command using an input key 11N (step S108). When no end command has been input, program control returns to step S102 to input the next character. When, however, an end command entry is detected, the Braille dot combination input process is terminated.

The data for the input character string can be regarded as data for a character string input using the common portable telephone terminal input method. For example, the character data string can be transmitted (output) by the communication unit 19 to an external device for the exchange of messages. Further, as another example, when the terminal 10A includes an e-mail creation function, the data for the character string can be output to the e-mail document storage area, and stored therein a document to be used for e-mail. And when the terminal 10A includes an address book function, the data for the character string can be output to the address storage area of the memory, and be stored as address data.

In this manner, when the user manipulates the input keys 11N to enter dots P1 to P6 for a Braille dot combination, the dot combination can be input to the terminal 10A. At this time, since a string of input characters can be fed back as speech, even a visually impaired person can confirm input characters. With this terminal 10A, therefore, a visually impaired person will be able to enter character strings very easily.

Since Braille is standardized for each language, and the required input manipulation does not differ depending on the maker of a terminal 10, it is a convenient tool for users. Because a total of only six numerical keys 11N are employed when inputting Braille, and this system therefore requires a smaller number of keys than do the other systems (the portable telephone terminal system and the pager system), which employ all the numerical keys 11N, and because the distance a user's fingers must travel is smaller, erroneous operations seldom occur.

While the above explanation has been given mainly by using the terminal 10A, the same configuration can be applied for the terminals 10B and 10C.

In addition, when the input keys 11 are integrally formed, as for the terminals 10B and 10C, the numerical keys 11N for "1", "3", "4", "6", "7" and "9" can be manipulated by both hands. Therefore, erroneous manipulation errors seldom occur, and characters can be input rapidly. Furthermore, since the terminal 10C can be folded so that both the display unit 12 and the input keys 11 are exposed, a user can hold the terminal 10C with the display unit 12 facing up, and can use the fingers of both hands to manipulate the input keys 11 on the reverse side.

The thus arranged terminal 10 (10A, 10B or 10C) does not differ from a conventional telephone terminal in its hardware configuration, and can be implemented merely by changing the program stored in the controller 14. Further, while the terminal 10 includes the Braille input function, character input can also be performed using the portable telephone terminal method and the pager method, and since no special manipulative procedures are required for this, a person with normal sight will have no trouble using the terminal 10.

In the first embodiment, the Braille dot combinations in FIG. 6 are employed as examples. For Braille, there are two sides: the side whereon Braille is read by touch (hereinafter referred to as the Braille reading side), and the side whereon Braille is written (hereinafter referred to as the Braille writing side). The example in FIG. 6, the Braille dot combinations are viewed from the Braille reading side; however, for input, Braille is not limited to this, and may also be viewed from the writing side. Further, when entering Braille using the terminal 10C, since the input keys 11 are inverted relative to normal ones, inverted Braille may be input. It should be noted that it is preferable that a user of Braille select either normal input or inverted input.

The terminal 10 in the first embodiment is so designed that in addition to the Braille input mode, the portable telephone terminal character input mode and the pager character input mode can be selected; in addition to the Braille input mode; however, the terminal 10 may include only one of these character input modes, or may include another input mode.

A second embodiment will now be described. In the first embodiment, the terminal 10 comprises the character converter 16 for converting a Braille entry into a character, and the speech synthesis controller 18 for outputting speech synthesized in accordance with a character string that is input. In the second embodiment, a terminal 50 that serves as a communication terminal does not have these components. In the following explanation, the same reference numerals are used to denote components corresponding with or identical to those in the first embodiment, and no further explanation for them will be given.

Figure 10:
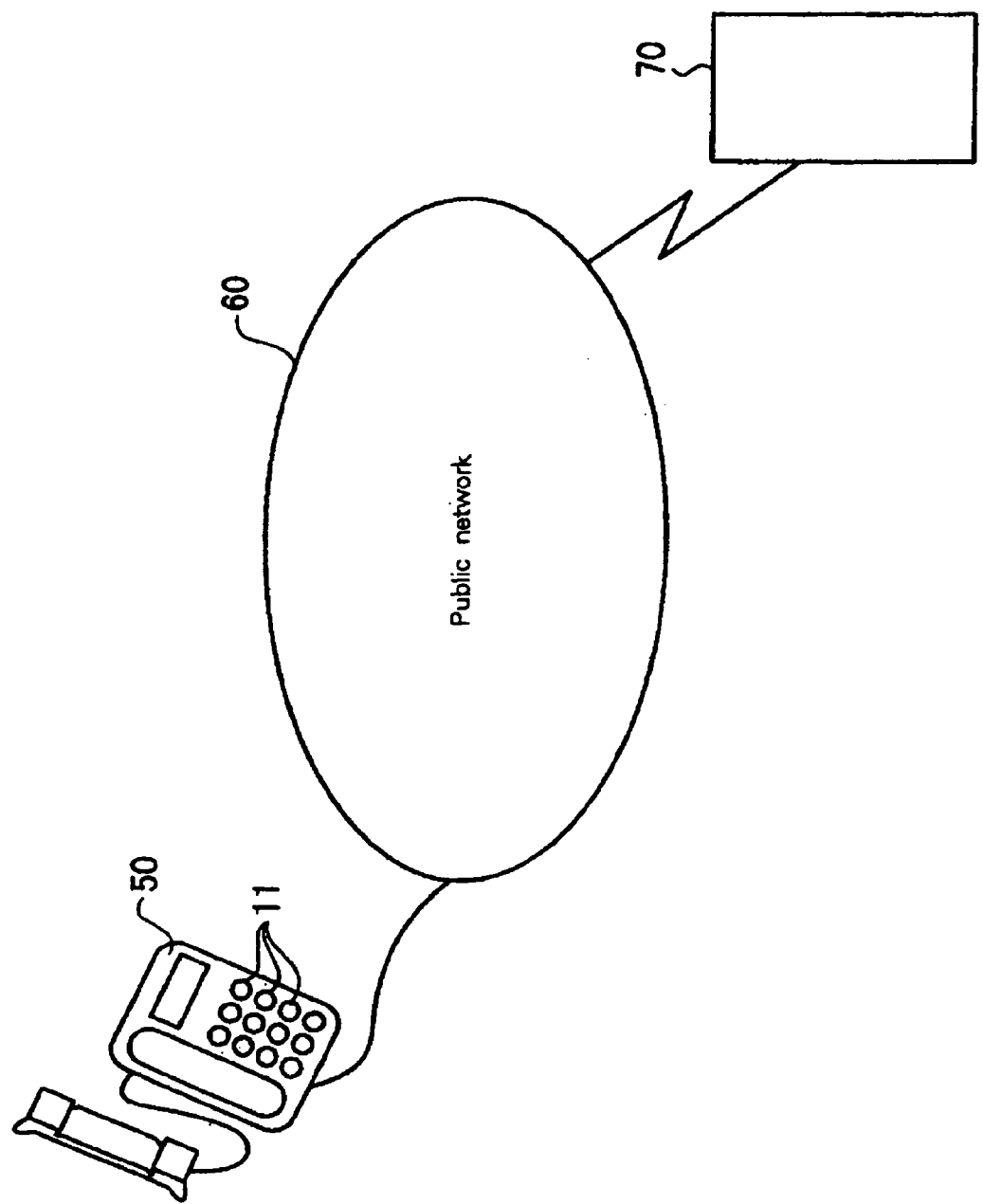
FIG. 10 is a diagram showing a system configuration according to a second embodiment.

FIG. 10 is a diagram showing a character input service system or a Braille service providing system according to the second embodiment. As is shown in FIG. 10, the terminal 50 of a user can access a server (a speech feedback server or a host server) 70 at a service provider via a network, such as a public network 60. In this embodiment, the service provider provides, for example, a service for accepting a library book reservation from a user.

In this system, when the user enters Braille using the terminal 50, a corresponding signal is transmitted to the server 70 via the public network 60. Based on the received signal, i.e., the Braille that is input, the server 70 identifies a corresponding character, and feeds back to the terminal 50, via the public network 60, speech data for orally reading this character. When the user enters Braille using the terminal 50 to transmit a character string to the server 70, the server 70 provides, for the user, a service that is consonant with the contents of the input character string.

Figure 11:
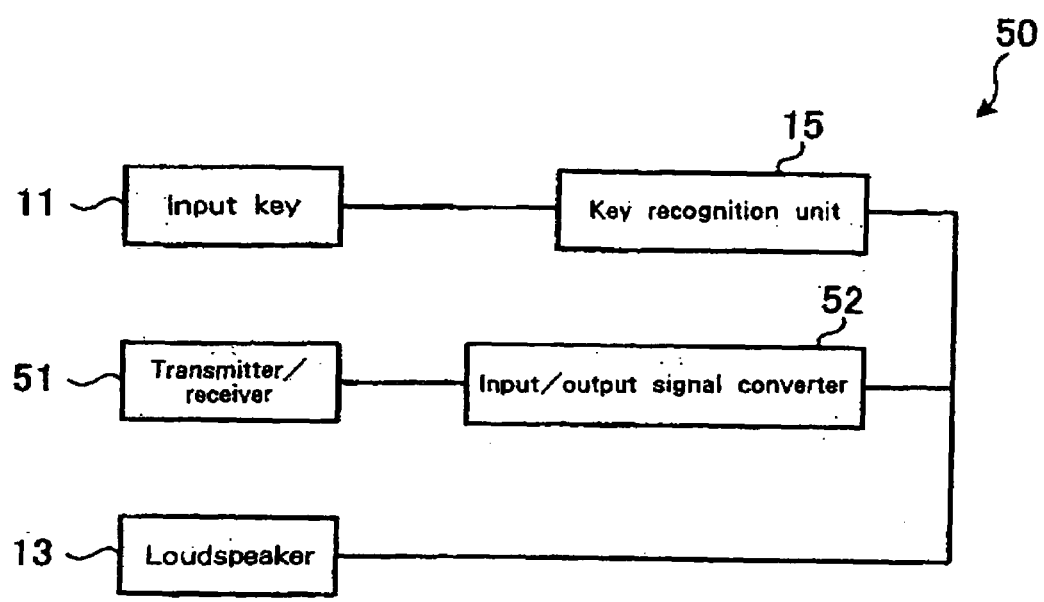
FIG. 11 is a diagram showing the configuration of a terminal according to the second embodiment.

As is shown in FIG. 11, the terminal 50, which is a common terminal telephone, comprises at the least input keys 11, a key recognition unit 15, a transmitter/receiver (signal transmission unit and reception unit) 51, an input/output signal converter (signal generator) 52, and a loudspeaker 13. The transmitter/receiver 51 communicates with external devices via the public network 60. And as a signal to be transmitted by the transmitter/receiver 51, the input/output signal converter 52 generates a signal (e.g., a tone signal, a pulse signal or a digital signal) that is consonant with the type of input key 11 identified by the key recognition unit 15. The input/output signal converter 52 converts a signal received by the transmitter/receiver 51 into speech that it outputs through the loudspeaker 13.

In this embodiment, the terminal 50 can be a stationary telephone terminal, a portable telephone terminal or a wireless telephone terminal, and the terminals 10A, 10B and 10C in the first embodiment can also be employed. Further, the terminal 50 may also be an analog telephone terminal, i.e., any telephone terminal can be employed so long as it can transmit a signal in accordance with the contents input by the manipulated input key 11, and output a speech through the loudspeaker 13 based on a received signal.

Figure 12:
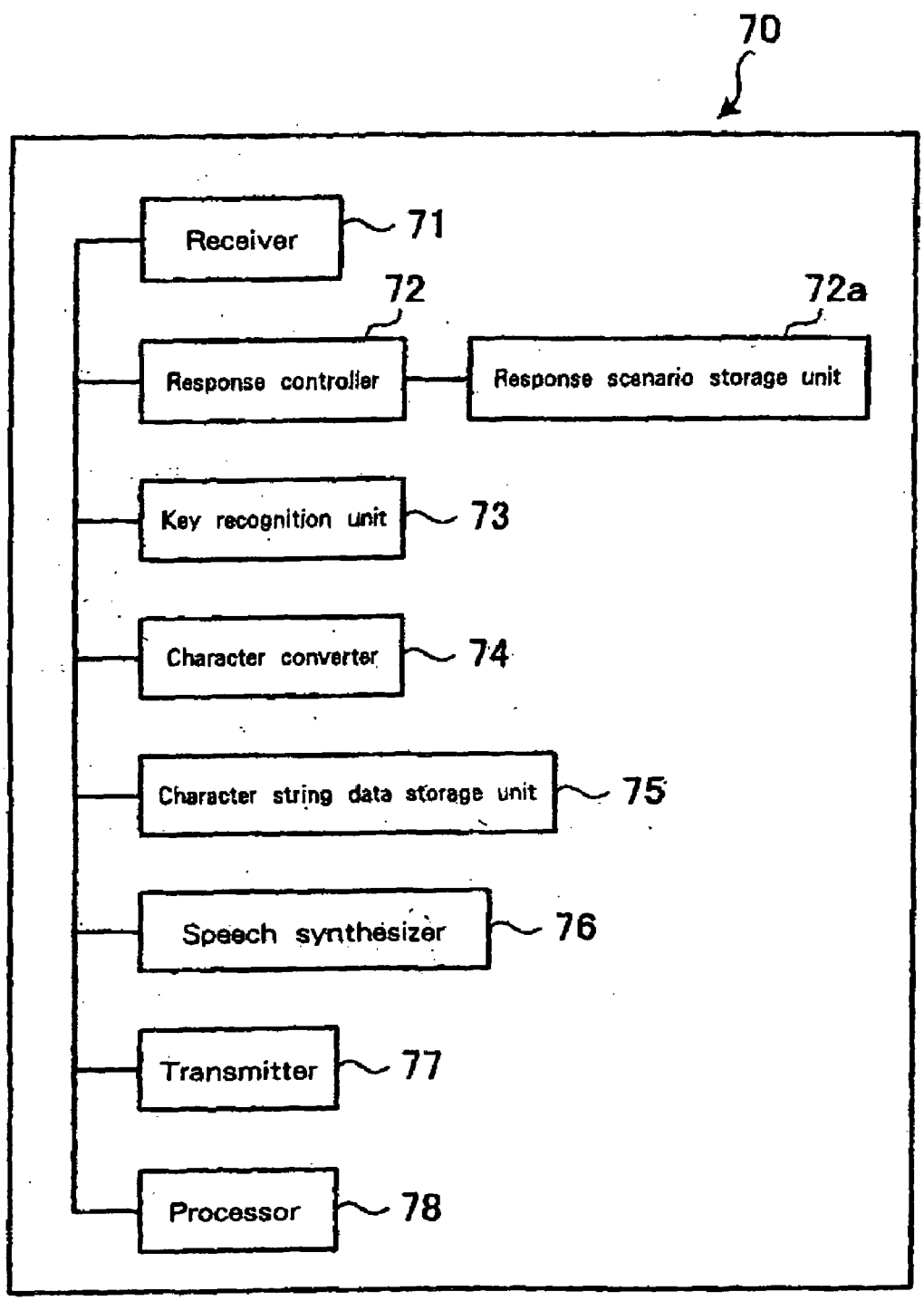
FIG. 12 is a diagram showing the arrangement of a server.

As is shown in FIG. 12, the server 70 comprises a receiver 71, for receiving a signal from an external device via the public network 60, a response controller (speech message output unit) 72, a key recognition unit 73, a character converter (Braille dot combination specification unit) 74, a character string data storage unit (character string generator) 75, a speech synthesizer (speech synthesis signal generator) 76, a transmitter 77 for transmitting a signal to an external device via the public network 60, and a processor (process execution unit) 78.

When a connection to the terminal 50 is established, the response controller 72 outputs a speech signal for a predetermined response message based on a response scenario program stored in a response scenario storage unit 72a. The speech signal is transmitted by the transmitter 77 to the terminal 50.

The key recognition unit 73 functions in the same way as the key recognition unit 15 in the first embodiment. That is, the key recognition unit 73 identifies the type of input key 11 that is manipulated based on a signal received from the terminal 50 via the public network 60, and transmits the results to the character converter 74. As well as the character converter 16 in the first embodiment, the character converter 74 performs character conversion based on the contents of the manipulated input key 11. That is, the character converter 74 accepts a Braille entry using the numerical key 11N, converts the Braille entry into a corresponding character, and transmits (outputs) the data for the character to the character string data storage unit 75. Since the same Braille conversion rule as in the first embodiment is employed by the character converter 74, no further explanation for it will be given. When the terminal 50 employs DTMF, it is especially effective for the character converter 74 to use the conversion rule for skipping input explained in the first embodiment.

As well as in the character string data storage unit 17 in the first embodiment, the character string data storage unit 75 stores character data are in the order in which they are transmitted by the character converter 74, generates a character string, and transmit the data for the string to the speech synthesizer 76. Based on a speech synthesis program stored in advance, the speech synthesizer 76 performs a speech synthesis process for the received character string data and generates a speech signal as a feedback signal. The obtained speech signal is then transmitted by the transmitter 77 to the terminal 50. The processor 78 identifies the contents requested by a user in a message consisting of a character string, and performs a corresponding process.

The processing performed by the thus arranged system will now be described while referring to FIG. 13.

Figure 13:
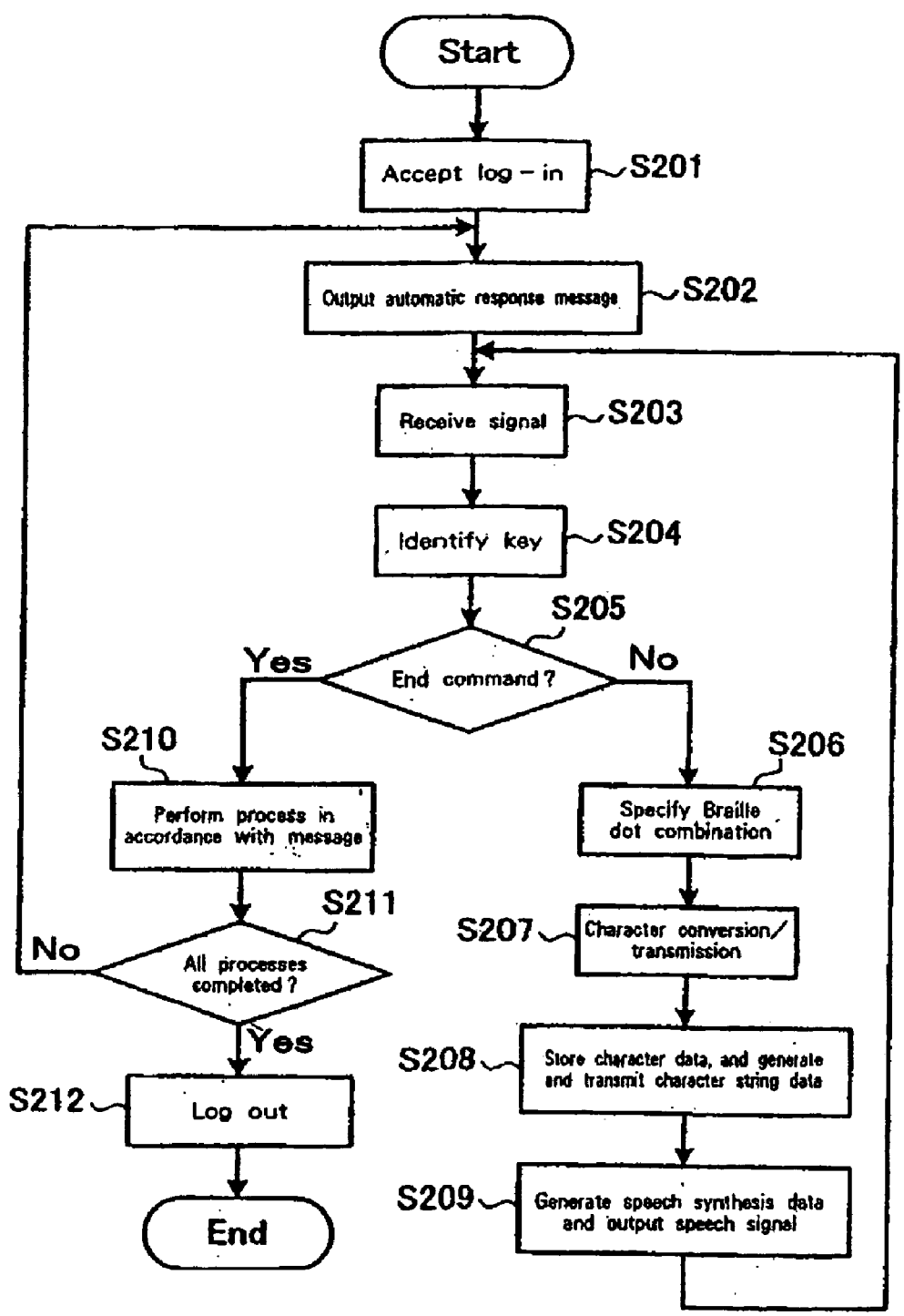
FIG. 13 is a flowchart showing the processing performed by the server.

As is shown in FIG. 13, when a user employs the terminal 50 to make a call to the server 70, the server 70 accepts the call and logs it in (step S201). Based on the response scenario program stored in the response scenario storage unit 72a, the response controller 72 of the server 70 automatically outputs a speech signal as a response message requesting that the user enter a character string (step S202).

Specifically, the entry of the title or the author of a book the user wants to make a reserve is requested.

The speech signal is transmitted by the transmitter 77 to the terminal 50. At the terminal 50, the transmitter/receiver 51 receives the speech signal, and the input/output signal converter 52 converts the speech signal into speech and outputs, through the loudspeaker 13, the speech as a response message from the server 70.

The user enters, at the terminal 50, an answer message or a request message corresponding to the contents of the response message, i.e., the information for the title or the author of a book the user desires to reserve. At this time, as in the first embodiment, the user manipulates the numerical keys 11N (see FIG. 5) of the input keys 11 to enter Braille dot combinations that represent the character string of the message, and confirms each character by depressing the pound sign key 11S. Each time the user manipulates the numerical keys 11N or the pound sign key 11S of the terminal 50, a signal is transmitted to the server 70. Specifically, a signal (a tone signal, a pulse signal or a digital signal) that is consonant with the numerical keys 11N or the pound sign key 11S identified by the key recognition unit 15 is generated by the input/output signal converter 52 and is transmitted by the transmitter/receiver 51 to the server 70. This is no different from what happens when a signal is transmitted as a key for a conventional telephone terminal is manipulated.

When the server 70 receives a signal from the terminal 50 each time a numerical key 11N or the pound sign key 11S is manipulated (step S203), the key recognition unit 73 identifies the type of numerical key 11N that was manipulated or the pound sign key 11S, and transmits the data to the character converter 74 (step S204).

The character converter 74 determines whether the confirmation for each character using the pound sign key 11S has been performed. So long as the character converter 74 does not detect a confirmation operation, the manipulation contents of the numerical keys 11N identified by the key recognition unit 73, i.e., the data for a numerical string entered by using the numerical keys 11N, are accumulated. Then, when a confirmation operation using the pound sign key 11S is detected, a check is performed to determine whether the content (the numerical strings) of the numerical keys 11N that have been manipulated is a predetermined message input end command (step S205).

When the data do not constitute a message input end command, the input Braille dot combination is specified by referring to the correlations in FIGS. 6, 7 and 8, and in accordance with the manipulations (the numerical string) of the numerical keys 11N. Then, the character converter 74 converts the specified Braille dot combination into a corresponding character, and transmits (outputs) the data for the character to the character string data storage unit 75 (step S207).

In the character string data storage unit 75, the character data are stored sequentially in the order in which they are received from the character converter 74, and a character string and the data therefore are generated. Each time a new character is added to the generated character string, the data for the generated character string is transmitted by the character string data storage unit 75 to the speech synthesizer 76 (step S208).

The speech synthesizer 76 performs a speech synthesis process for the data for the received character string, and generates speech synthesis data (speech response signal), while the transmitter 77 transmits to the terminal 50 a speech signal corresponding to the speech synthesis data (step S209).

In the terminal 50 the input/output signal converter 52 converts the speech signal received from the server 70 into speech, and the speech is output through the loudspeaker 13. This speech is a character string that the user entered at the terminal 50 using Braille, and the user receives the speech that serves as feedback for the message that he or she entered. Until the entry of the message is completed, the user continues to input Braille dot combinations to the terminal 50, and the processes at steps S203 to S209 are repeated.

When the entry of the message is completed, the user enters the predetermined end command using the input keys 11, and finally confirms it using the pound sign key 11S. Then, as during normal Braille input, the server 70 receives a signal corresponding to the operation (step S203), identifies the key type (step S204), and ascertains that the end command has been input at the terminal 50 (step S205). In this case, the processor 78 accepts the character string that was received at the terminal 50 before the end command was entered, i.e., the message received from the user. Further, the processor 78 identifies the contents of a user's request in the received message, and performs a corresponding process based on a predetermined process program (step S210). For example, based on the title or the author of a book the user reserves, the processor 78 performs a process a search of the books in stock.

When the process at S210 has been completed, in order to perform all the service related processes provided by the service provider, a check is performed to determine whether, based on the response scenario program stored in the response scenario storage unit 72*a*, all the processes have been completed (step S211). When not all processes have been completed, the program returns to step S202 and the automatic response message to advance to the next process is output. For example, the presence/absence in stock of the book is a response given as a result of the search, and when the book is in stock, an inquiry is transmitted to determine whether the user desires to reserve the book. In this manner, until information required to complete all the service related processes provided by the service provider is obtained, the server sequentially transmits an automatic response message to the terminal 50, and the user inputs a corresponding message. That is, when the book desired by the user is in stock, and when the user desires to reserve the book, the user is requested to enter information, such as his or her registration number and name, and to perform a process required to complete the reservation or to accept a search for another book. Further, the book is not in stock, a process required for completing a series of procedures is performed.

When it is ascertained at step S211 that all the service related processes have been completed, the server 70 performs a process for logging out the terminal 50 (step S212).

With the above system configuration, the user can employ the terminal 50 to enter Braille dot combinations in the same manner as in the first embodiment. Since the input character string is fed back by the server 70 and is output as speech, even a visually impaired person can confirm an input character string. Therefore, a visually impaired person can easily input character strings using this terminal 50. Further, as the function for identifying the Braille dot combinations and the speech synthesis function are not required for the terminal 50, a conventional terminal 50 can be employed unchanged. Therefore, a user does not need purchase a new terminal, and can also use a public telephone when he or she is away from the office.

Further, according to the system, when the user employs the terminal 50 to enter, using Braille, information for a desired book in accordance with a speech response message transmitted by the server 70, the user can receive the service, such as reservation of a book. Thus, a visually impaired person can also receive various services using the terminal 50.

In this embodiment, the service provider uses the server 70 to provide a book reservation service for a library, the services that can be offered are not limited to this one. For example, so that various services can be provided for a user, on a portable telephone terminal a service provider conventionally uses a character string to display a menu screen for the user and the user must then perform a predetermined operation on the menu screen; however, a variety of services may also be provided when speech is used to inform a user of the services that are available from a service provider, and the user employs Braille to enter a reply or a response.

In the above embodiment, Braille is entered at the terminal 50. However, as well as the character converter 16 of the terminal 10 in the first embodiment, the character converter 74 of the server 70 can accept characters entered using the portable telephone terminal input mode or the pager input mode, so that characters can be input at the terminal 50 using either of these two modes.

In the first and second embodiments, a so-called telephone terminal is employed as the terminals 10 and 50. However, so long as multiple keys that can be used to enter Braille and a speech output unit for outputting speech as feedback are included, a portable information terminal, such as a PDA (Personal Digital Assistants), may be employed.

Further, the configuration of each embodiment can be selectively employed or can be variously modified without departing from the scope of the invention.

As is described above, according to the invention, since Braille input is enabled, an input apparatus, a communication terminal and a portable communication terminal can be provided that are eminently superior in usability for visually impaired persons. Further, according to the speech feedback system of the invention, convenient services can be provided for visually impaired persons.

What is claimed is:

1. A communication terminal comprising:
   a group of keys arranged in a multiple row, multiple column matrix;
   a key detector for detecting manipulations of said keys;
   a processor for performing a process in accordance with said manipulations of said keys detected by said key detector; and
   a communication unit for communicating with an external unit, wherein six keys, arranged in two columns and three rows, are allocated for dots for Braille;

wherein said processor specifies Braille dot combinations corresponding to said manipulations of said keys detected by said key detector, and converts said specified Braille dot combinations into characters that are output through said communication unit; and wherein a first mode for allocating ordinary numbers, such as 0 to 9, or symbols, such as * and #, and a second mode for allocating dots for Braille are available for said keys, and wherein said processor can switch between said first mode and said second mode.

2. The communication terminal according to claim 1, wherein said processor can switch among said first mode, said second mode and a third mode for allocating characters for said keys.

3. A communication terminal comprising:
a group of keys arranged in a multiple row, multiple column matrix;
a key detector for detecting manipulations of said keys;
a processor for performing a process in accordance with said manipulations of said keys detected by said key detector; and
a communication unit for communicating with an external unit,
a tone generator for generating different tones for each row and column of said keys, wherein, when n keys are manipulated and said key detector has detected tones corresponding to keys of two columns and n rows, it is assumed that said keys at the locations where at said two columns and n rows intersect have been manipulated;
wherein six keys, arranged in two columns and three rows, are allocated for dots for Braille;
wherein said processor specifies Braille dot combinations corresponding to said manipulations of said keys detected by said key detector, and converts said specified Braille dot combinations into characters that are output through said communication unit.

4. A communication terminal comprising:
a group of keys arranged in a multiple row, multiple column matrix;
a key detector for detecting manipulations of said keys;
a processor for performing a process in accordance with said manipulation of said keys detected by said key detector; and
a communication unit for communicating with an external unit,
wherein six keys, arranged in two columns and three rows, are allocated for dots for Braille;
wherein said processor specifies Braille dot combinations corresponding to said manipulations of said keys detected by said key detector, and converts said specified Braille dot combinations into characters that are output through said communication unit; and
wherein, when the same key is manipulated at multiple times in said second mode said processor regards such manipulations as a single operation.

5. A portable communication terminal comprising:
a key body having operating keys on a surface; and
a display body, pivotally connected to said key body, having a display panel on a surface,
wherein said key body and said display body can be folded together so that said surface of said key body on which said operating keys are positioned and said surface of said display body on which said display panel is positioned are exposed;
a key detector for detecting manipulations of said operating keys;

a processor for performing a process in accordance with said manipulations of said operating keys detected by said key detector; and
a communication unit for outputting a signal to the outside based on the process performed by said processor,
wherein, said processor allocates six operating keys among said operating keys, arranged in two columns and three rows, for dots used to specify a Braille dot combination that corresponds to said manipulations of said operating keys detected by said key detector, and outputs a signal representing a character corresponding to said specified Braille dot combination through said communication unit as said output signal.

6. The portable communication terminal according to claim 5, further comprising:
a speech output unit for outputting speech,
wherein said processor synthesizes speech based on characters obtained by conversion, and permits said speech output unit to release said speech.

7. The portable communication terminal according to claim 6, wherein said processor allocates dots for said Braille keys in a column at one end of said key body and in a column at the other end.

8. A feedback system wherein, in accordance with an operation performed by a user terminal which has accessed a server of service provider, said server feeds back speech to said terminal; wherein said terminal includes
operating keys for data entry by a user,
a communication unit for communicating with said server,
a signal generator far generating a signal in accordance With the manipulation of said operating keys, and for transmitting said signal through said communication unit, and
a speech output unit for outputting speech based on a feedback signal received through said communication unit; and wherein said server includes
a reception unit for receiving said signal from said terminal,
a character converter for converting said signal received by said reception unit into a corresponding character,
a speech synthesis signal generator for generating a speech synthesis signal based on said character, and
a transmission unit for transmitting said speech synthesis signal as said feedback signal.

9. The feedback system according to claim 8, wherein based on said signal received, said character converter specifies a Braille dot combination corresponding to the manipulation of said operating keys, and converts said Braille dot combination into a corresponding character.

10. The feedback system according to claim 8, wherein said server further includes:
a speech message output unit for outputting, as a speech signal, a message requesting that said terminal enter data.

11. The feedback system according to claim 8, wherein said server further includes:
a character string generator for generating a character string by sequentially accumulating characters obtained by said character converter; and
a process execution unit for accepting a request from said user comprising said character string generated by said character string generator, and for performing a process in accordance with said request.

12. A speech feedback server comprising:
a reception unit for receiving signals from an external terminal;

a key identification unit for, based on said received signals, identifying operating keys manipulated at said external terminal;

a Braille specification unit for specifying a Braille dot combination corresponding to the manipulations of said operating keys identified by said key identification unit;

a character converter for converting said Braille dot combination specified by said Braille specification unit into a corresponding character;

a character, string generator for generating a character string by sequentially accumulating characters obtained by said character converter; and a process execution unit for performing a process in accordance with a user's request comprising said character string generated by said character string generator.

13. A communication terminal comprising:

a group of keys arranged in a multiple column, multiple row matrix;

a key detector for detecting manipulations of said keys;

a signal transmission unit for transmitting, to an external host server, an output signal that is consonant with said manipulations of said keys detected by said key detector;

a reception unit for receiving, from said host server, a speech response signal that is generated by said host server in accordance with a character that corresponds to a Braille dot combination obtained by conversion based on said output signal; and a speech output unit for outputting speech based on said speech response signal.

* * * * *

UNITED STATES PATENT AND TRADEMARK OFFICE
CERTIFICATE OF CORRECTION

| | | |
|---|---|---|
| PATENT NO. | : 7,107,219 B2 | Page 1 of 1 |
| APPLICATION NO. | : 09/682896 | |
| DATED | : September 12, 2006 | |
| INVENTOR(S) | : Kazuo Nemoto | |

It is certified that error appears in the above-identified patent and that said Letters Patent is hereby corrected as shown below:

Column 17, line 44, "manipulation" should be -- manipulations --

Column 17, Line 56, "mode" should be --mode--

Column 18, line 32, "far" should be -- for--

Column 18, line 33, "With" should be --with--

Signed and Sealed this

Fourth Day of September, 2007

JON W. DUDAS
*Director of the United States Patent and Trademark Office*